(12) United States Patent
Ikeda et al.

(10) Patent No.: US 9,122,262 B2
(45) Date of Patent: Sep. 1, 2015

(54) SERVO CONTROL DEVICE

(71) Applicants: Hidetoshi Ikeda, Tokyo (JP); Akio Saito, Tokyo (JP); Yuji Igarashi, Tokyo (JP)

(72) Inventors: Hidetoshi Ikeda, Tokyo (JP); Akio Saito, Tokyo (JP); Yuji Igarashi, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/351,040

(22) PCT Filed: Sep. 27, 2012

(86) PCT No.: PCT/JP2012/074948
§ 371 (c)(1),
(2) Date: Apr. 10, 2014

(87) PCT Pub. No.: WO2013/054662
PCT Pub. Date: Apr. 18, 2013

(65) Prior Publication Data
US 2014/0300308 A1    Oct. 9, 2014

(30) Foreign Application Priority Data
Oct. 13, 2011    (JP) .................................. 2011-225541

(51) Int. Cl.
*G05B 11/01* (2006.01)
*G05B 13/00* (2006.01)
(Continued)

(52) U.S. Cl.
CPC .............. *G05B 13/042* (2013.01); *G05B 19/00* (2013.01); *H02P 21/146* (2013.01); *H02P 2021/0057* (2013.01)

(58) Field of Classification Search
CPC ... G05B 6/02; G05B 5/01; G05B 2219/42093
USPC .......................................... 318/561, 560, 630
See application file for complete search history.

(56) References Cited

U.S. PATENT DOCUMENTS

2008/0111514 A1* 5/2008 Ohta et al. .................... 318/609
2008/0218116 A1* 9/2008 Maeda et al. ................. 318/571
(Continued)

FOREIGN PATENT DOCUMENTS

JP    8 249067    9/1996
JP    10 56790    2/1998
(Continued)

OTHER PUBLICATIONS

International Search Report Issued Dec. 11, 2012 in PCT/JP12/074948 Filed Sep. 27, 2012.

*Primary Examiner* — Erick Glass
(74) *Attorney, Agent, or Firm* — Oblon, McClelland, Maier & Neustadt, L.L.P.

(57) ABSTRACT

A reference model unit calculates a model position, with which a model of a controlled object follows a position command, and a model torque for the model of the controlled object to operate to coincide with the model position. A gain changing unit changes, during the operation of the controlled object, at least a value of one control gain of first-order and second-order control gains used for calculation of a variable compensation value output to an integral compensator by a variable-compensation calculating unit based on at least one of the model position, a position detection value, and a torque command output to the controlled object by a torque adder, and reflects the value on calculation of the variable compensation value.

4 Claims, 3 Drawing Sheets

(51) Int. Cl.
*G05B 13/04* (2006.01)
*G05B 19/00* (2006.01)
*H02P 21/14* (2006.01)
*H02P 21/00* (2006.01)

(56) References Cited

U.S. PATENT DOCUMENTS

2010/0079100 A1* 4/2010 Kumagai et al. ............... 318/611

2013/0057191 A1* 3/2013 Yoshiura et al. ............... 318/600

FOREIGN PATENT DOCUMENTS

| JP | 2001 249720 | 9/2001 |
| JP | 2001 356822 | 12/2001 |
| JP | 2003 204689 | 7/2003 |
| JP | 2006 79526 | 3/2006 |
| JP | 2008 15610 | 1/2008 |
| JP | 2009 118684 | 5/2009 |

* cited by examiner

SERVO CONTROL DEVICE

FIELD

The present invention relates to a servo control device.

BACKGROUND

As a driving device for a large number of industrial machines, a general-purpose servo control device is used. Parameters, such as a control gain, are adjusted and set according to uses and characteristics of the machines to realize a desired control performance as much as possible. As motors directly controlled by the servo control device, there are a rotary motor and a linear motor. In this specification, in order to facilitate understanding, the rotary motor is explained. That is, when a motor for driving a controlled object mechanical system is, for example, a rotary motor, the servo control device generates a torque command to the rotary motor by performing position control and speed control by feedback control such that the position and the speed of the controlled object follow target values.

In the servo control device, when a control gain used for the position control and the speed control by the feedback control is increased, follow-up control accuracy to the target values can be improved. However, when the control gain is too large, on the contrary, a phenomenon such as oscillation occurs and the control becomes unstable.

Therefore, the control gain is adjusted and set to be as large as possible within a range in which the control does not become unstable. However, in an actual controlled object, non-linear characteristics are included in driving force transmission mechanisms, such as a gear and a ball screw, and mechanical systems including mechanical resonance, friction, and the like. Therefore, the ease of oscillation is different depending on operation conditions, such as speed and acceleration of a mechanical system driven by a motor.

Therefore, in a conventional servo control device, in general, a control gain having a small value with a margin given to oscillation to prevent control from becoming unstable under various operation conditions is fixedly set. That is, the conventional servo control device performs control by using a constant fixed value control gain and does not change the control gain according to the control content. Therefore, the control performance cannot be further improved. Various proposals have been made to solve such problems (e.g., Patent Literatures 1 and 2).

That is, Patent Literature 1 proposes a technology for, in a servo control device used in position control, switching a control gain to a small value during a stop of a controlled object to thereby increase stability during the stop and relatively increasing the control gain during the operation of the controlled object to realize control higher in speed and accuracy than a control system having a fixed gain.

The servo control device described in Patent Literature 1 performs, based on a deviation between a position command and a position detection value, position PI control applied with a position proportional gain and a position integral gain to generate a speed command and performs, based on a deviation between the speed command and a speed detection value, the speed PI control applied with a speed proportional gain and a speed integral gain to generate a torque command (a current command). The servo control device sets a setting value of a speed level in advance and switches a gain according to a speed detection value to set the position proportional gain relatively high when the speed detection value is larger than the setting value and set the position proportional gain to a relatively low value when the speed detection value is lower than the setting value. That is, the servo control device performs a change for reducing the control gain only in the vicinity of a stop of the operation of the controlled object.

Contrary to Patent Literature 1, Patent Literature 2 proposes a technology for changing a control gain while a controlled object is operating.

That is, Patent Literature 2 discloses a technology for providing a model calculating unit (a reference model unit) that receives a position command as an input and outputs a model torque and a model position ideal for servo control, generating, based on a signal obtained by multiplying a positional deviation between the model position and an actual position of a controlled object by a position proportional gain, a feedback torque command (deviation compensation torque) to reduce the positional deviation, and adding up the feedback torque command and the model torque to generate a torque command for a motor.

In Patent Literature 2, assuming control of a truck called stacker crane, control for changing the position proportional gain to be smaller when the moving speed of the truck, that is, the speed of a motor is large than when the moving speed is small is performed for the purpose of preventing the control from too sensitively reacting to a phenomenon that, although highly accurate control is requested for positioning accuracy during a stop, wheels slip on the road surface in a high-speed state. Specifically, there is disclosed a technology for setting the position proportional gain as a polynomial based on the detection speed, the model speed obtained by differentiating the model position, and the like, to continuously change the position proportional gain according to the level of the speed.

CITATION LIST

Patent Literature

Patent Literature 1: Japanese Patent Application Laid-Open No. 2003-204689

Patent Literature 2: Japanese Patent Application Laid-Open No. 2006-79526

SUMMARY

Technical Problem

As explained above, in the general servo control device, the control gain of the feedback control system is fixedly set to a sufficiently low control gain so that control can be stably performed under various operation conditions. Therefore, it is difficult to further improve the control performance. In the technologies described in Patent Literatures 1 and 2 proposed to solve the problems, there are problems explained below.

First, in the technology described in Patent Literature 1, the control gain is reduced in the vicinity of the stop of the operation of the controlled object. However, when a positional deviation occurs during switching of the control gain, a torque command discontinuously changes because of the gain switching. Therefore, when a condition is set to execute switching even at a point when the positional deviation is large, a shock and sound are generated in a mechanical system during the switching. Even if, for example, a filter is added so that torque continuously changes during the gain switching as measures against the problem, because the gain switching is performed, characteristics, such as speed of follow-up to a command, change before and after the switching. Therefore, when the gain switching is performed while a controlled object is caused to operate, even if the torque itself of the motor does not change, the operation of the controlled object substantially changes in principle. Therefore, in the technology described in Patent Literature 1, for example, in a specific use such as a positioning operation for performing steep acceleration and deceleration in a short time, oscillation often occurs during a stop. Therefore, control for reducing a control gain only in the vicinity of the stop is possible. However, for a use in which oscillation tends to occur at time other than during the stop, for example, when gentle acceleration and deceleration or an operation with a long fixed speed state is performed, the control gain cannot be switched while the controlled object is operating; therefore, the control performance cannot be improved. Therefore, with the technology described in Patent Literature 1, for various uses, the control performance cannot be improved more than the general feedback control system for a fixed control gain.

In the technology described in Patent Literature 2, the control system including the reference model unit to add up a model torque in a feed forward manner continuously changes the position proportional gain based on the polynomial of speed. However, in some cases, it is not easy to appropriately determine the polynomial and it is not easy to perform calculation on a real time basis. In addition, for example, when it is attempted to realize a simple and sure method for grasping beforehand a gain that does not oscillate only under a condition in which oscillation easily occurs, such as a fixed speed or low speed condition, and under a condition in which oscillation less easily occurs other than that condition and reducing the gain only under the condition in which oscillation easily occurs, it is conceivable that the gain is discontinuously or steeply changed greatly as two numerical values. However, it is not preferable to change the gain in this way because a torque command discontinuously or steeply changes and sound and a shock are given to the controlled object. Therefore, in the technology described in Patent Literature 2, there is a problem in that, because it is necessary to design a gain that gently changes, labor and time are necessary and, because the gain cannot be steeply and greatly changed, the performance improvement is limited.

That is, although the related art exerts an effect in some cases in a specific use, when application to various uses in which the performance improvement is expected by varying the control gain is considered, an inconvenience occurs or the performance cannot be sufficiently improved. Therefore, an application range is limited.

The present invention has been devised in view of the above and it is an object of the present invention to obtain a servo control device that can realize, without causing discontinuity of a driving force command and a sudden change of an operation, control for further improving the control performance for various uses by varying a control gain than a control system for a normal fixed control gain.

Solution to Problem

In order to achieve the above object, the servo control device according to the present invention is a servo control device that generates, based on an operation detection signal representing a detected operating position or operating speed of a controlled object and an operation command given from a upper-level apparatus as a target value for the operating position or the operating speed of the controlled object, a driving force command, which is a command for generating a driving force given to a motor that drives a mechanical system of the controlled object, such that the operating position or the operating speed of the controlled object follows the operation command, includes a reference model unit that calculates, based on the operation command, a model operation signal representing a model operating position or model operating speed, with which an assumed model of the controlled object follows the operation command according to a predetermined characteristic, and calculates a model driving force, which is a driving force necessary for the assumed model of the controlled object to operate to coincide with the calculated model operation signal; a variable-compensation calculating unit that adds at least one of a value obtained by multiplying a first-order differential value of a control deviation, which is a deviation between the model operation signal and the operation detection signal, by a first-order control gain, which is a second control gain, and a value obtained by multiplying a second-order differential value of the control deviation by a second-order control gain, which is a third control gain, to a value obtained by multiplying the control deviation by a zeroth-order control gain, which is a first control gain, to output it as a variable compensation signal; a gain changing unit that changes, during an operation of the controlled object, a value of at least one control gain of the first-order control gain and the second-order control gain used for calculation of the variable compensation signal by the variable-compensation calculating unit based on at least one of the model operation signal, the operation detection signal, and the driving force command and reflects the value on calculation of the variable compensation signal; an integral compensator that integrates the variable compensation signal; and an adder that adds at least an output of the integral compensator to the model driving force and outputs it as the driving force command.

Advantageous Effects of Invention

According to the present invention, all signals affected by the control gain changed by the gain changing unit in the variable compensation signal pass through the integral compensator. Therefore, even while the controlled object is operating, it is possible to change only a suppression effect for an error with respect to disturbance without suddenly changing the driving force command to the motor and the operation of the controlled object. Therefore, there is an effect that it is possible to obtain a higher control performance than a control system for a normal fixed control gain flexibly for various uses in which the servo control device is used.

DESCRIPTION OF EMBODIMENTS

Embodiments of a servo control device according to the present invention are explained in detail below based on the drawings. Note that the present invention is not limited by the embodiments.

First Embodiment

Figure 1:
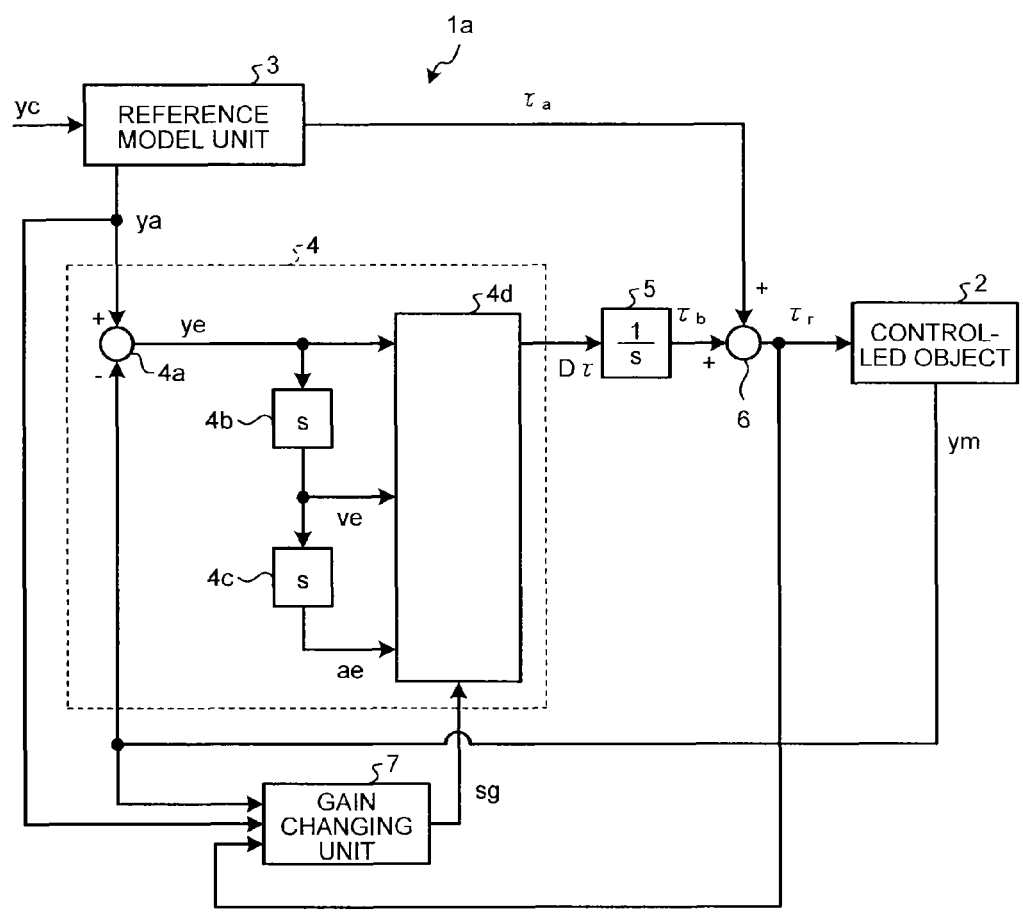
FIG. 1 is a block diagram of the configuration of a servo control device according to a first embodiment of the present invention.

FIG. 1 is a block diagram of the configuration of a servo control device according to a first embodiment of the present invention. In FIG. 1, a servo control device 1a according to the first embodiment includes, as a configuration for performing position control for causing an operating position of a controlled object 2 to follow a target value according to feedback control, a reference model unit 3, a variable-compensation calculating unit 4, an integral compensator 5, a torque adder 6, and a gain changing unit 7.

Although not shown in the figure, the controlled object 2 includes a motor (in this specification, a rotary motor is assumed), a current control unit that controls a driving current to the motor according to a torque command τr from the servo control device 1a (the torque adder 6 in the servo control device 1a), and a mechanical system driven by the motor generating torque corresponding to the torque command τr from the servo control device 1a according to the driving current from the current control unit. A detected rotating position of the motor is output as a position detection value ym of the controlled object 2. That is, the position detection value ym is input to the variable-compensation calculating unit 4 and the gain changing unit 7 in the servo control device 1a as a feedback signal. Note that one or both of a position detector and a speed detector are attached to the motor. The position detection value ym is a detection value of the position detector or an integral value of a detection value of the speed detector.

Next, the configuration and the operation of the servo control device 1a are explained.

A position command yc is input to the reference model unit 3 from a not-shown upper-level apparatus as an operation command. The reference model unit 3 calculates a model position (a model operation signal) ya, with which an assumed model of the controlled object 2 follows the position command yc according to a characteristic of a predetermined transfer function Fa(s), and calculates an ideal torque (model torque) τa for the assumed model of the controlled object 2 to operate to coincide with the model position ya calculated in this way.

For example, when a rigid body inertia, an inertia value (a model inertia value) of which is Ja, is assumed as the model of the controlled object 2, the reference model unit 3 performs calculation of the model position ya and calculation of a model acceleration aa, which is a second-order differential value of the model position ya, and multiplies the model acceleration aa by the model inertial value Ja to calculate the ideal torque (the model torque) τa necessary for the operation of the controlled object 2 to coincide with the model position ya.

The model position ya calculated by the reference model unit 3 is input to the variable-compensation calculating unit 4 and the gain changing unit 7. The model torque τa calculated by the reference model unit 3 is input to the torque adder 6.

The variable-compensation calculating unit 4 includes a subtractor 4a, differentiators 4b and 4c, and a variable-gain multiplying and adding unit 4d.

The subtractor 4a calculates a position deviation ye, which is a deviation (a control deviation) between the model position ya and the position detection value ym.

$$ye = ya - ym \quad (1)$$

The position deviation ye is input to the differentiator 4b and the variable-gain multiplying and adding unit 4d.

The differentiator 4b calculates a speed deviation ve, which is a differential value of the position deviation ye.

$$ve = d(ye)/dt \quad (2)$$

The speed deviation ve is input to the differentiator 4c and the variable-gain multiplying and adding unit 4d.

The differentiator 4c calculates an acceleration deviation ae, which is a differential value of the speed deviation ve.

$$ae = d(ve)/dt = d^2(ye)/dt^2 \quad (3)$$

The acceleration deviation ae is input to the variable-gain multiplying and adding unit 4d.

As indicated by Formula (4), the variable-gain multiplying and adding unit 4d calculates, as a variable compensation value Dτ, the sum value of a value obtained by multiplying the position deviation ye calculated by the subtractor 4a by a zeroth-order control gain K0, which is a first control gain, a value obtained by multiplying the speed deviation ve calculated by the differentiator 4b by a first-order control gain K1, which is a second control gain, and a value obtained by multiplying the acceleration deviation ae calculated by the differentiator 4c by a second-order control gain K2, which is a third control gain, and outputs the variable compensation value Dτ to the integral compensator 5. The values of the control gains K0, K1, and K2 used at this point are respectively gain values designated by a gain change signal sg input from the gain changing unit 7 explained below.

$$D\tau = K0 \cdot ye + K1 \cdot ve + K2 \cdot ae \quad (4)$$

In FIG. 1, the variable-compensation calculating unit 4 is shown such that it has a configuration associated with Formula (4). However, the variable-compensation calculating unit 4 only has to perform calculation equivalent to Formula (4). The configuration of the variable-compensation calculating unit 4 is not therefore particularly limited. For example, the variable-compensation calculating unit 4 is configured to calculate a differential value of the model position ya as a model speed va, calculate a differential value of the model speed va as a modem acceleration aa, calculate a differential value of the position detection value ym as a detection speed vm, calculate a differential value of the detection speed vm as a detection acceleration am, and calculate the variable compensation value Dτ as indicated by the following Formula (5). Even in this case, it is evident that the variable-compensation calculating unit 4 has completely the same effect.

$$D\tau = K0 \cdot ya + K1 \cdot va + K2 \cdot aa - K0 \cdot ym - K1 \cdot vm - K2 \cdot am \quad (5)$$

The calculation by the variable-gain multiplying and adding unit 4d indicated by Formula (4) may be formed as calculation of a cascade structure as indicated by the following Formula (6) using new control gains K1' and K0'.

$$D\tau = K2(ae + K1'(ve + K0' \cdot ye)) \quad (6)$$

In Formula (6), when K1'·K2 is replaced by K1 and K0'·K1'·K2 is replaced by K0, a relation equivalent to Formula (7) and Formula (8) explained below is obtained; therefore, completely the same effect can be obtained. It is easy to grasp the magnitude of each control gain as a physical quantity and implementation is easy in some cases.

Subsequently, the integral compensator 5 time-integrates the variable compensation value Dτ indicated by Formula (4) calculated by the variable-compensation calculating unit 4, calculates a deviation compensation torque τb corresponding to an integral characteristic of the variable compensation value Dτ, and outputs the deviation compensation torque τb to the torque adder 6. The torque adder 6 adds the deviation compensation torque τb to the model torque τa and outputs a torque command τr. The torque command τr is input to the current control unit in the controlled object 2 and the gain changing unit 7.

The deviation compensation torque τb calculated by the integral compensator 5 is indicated by Formula (7). Note that, in Formula (7), s represents a Laplacian operator.

$$\tau b = (1/s)(K0 + K1 \cdot s + K2 \cdot s^2) ye \quad (7)$$

If a functional unit, which is obtained by combining the variable-compensation calculating unit 4 and the integral compensator 5, for performing up to the calculation of the deviation compensation torque τb based on the deviation (the position deviation) ye between the model position ya and the position detection value ym is referred to as a feedback compensation unit, a transfer function τb/ye of the feedback compensation unit is calculated as the following Formula (8) from Formula (7):

$$\tau b/ye = K0/s + K1 + K2 \cdot s \quad (8)$$

That is, it is seen that the transfer function τb/ye of the feedback compensation unit is the same as general PID control and equivalent to a transfer function in which the zeroth-order control gain K0 is a position integral gain, the first-order control gain K1 is a position proportional gain, and the second-order control gain K2 is a position differential gain, that is, a speed proportional gain.

Then, if normal position PID control equivalent to Formula (8) is used as it is in the feedback compensation unit and each control gain is changed according to the action of the gain changing unit 7, the deviation compensation torque Tb discontinuously changes at a point of the change of the control gains according to the change of the first-order control gain K1 if the position deviation ye is not zero at the point of the change or according to the change of the second-order control gain K2 if the differential value (the speed deviation) ve of the position deviation ye is not zero. Therefore, when switching of the gains is performed at a point when the position deviation fluctuates in a transitional state immediately after the speed and the acceleration of the position command yc change, the torque command τr discontinuously changes and causes sound and vibration in the controlled object 2.

In contrast, in the first embodiment, the variable-compensation calculating unit 4 calculates the variable compensation value Dτ using all the control gains changed by the gain changing unit 7. The integral compensator 5 integrates the variable compensation value Dτ reflecting all the control gains to be changed and calculates the deviation compensation torque τb.

That is, in the first embodiment, all signals affected by the control gains changed by the gain changing unit 7 in the variable compensation value Dτ passes the integral compensator 5. Therefore, even if the variable compensation value Dτ discontinuously changes during the gain change, the deviation compensation torque τb, which is an output of the integral compensator 5, continuously changes. In other words, although a transfer function is completely the same as the normal PID control, it is possible to realize switching control that does not cause discontinuity in the torque command τr at all even if the control gains are discontinuously changed by the gain switching.

The gain changing unit 7 determines values of the control gains K0, K1, and K2 used in the variable-compensation calculating unit 4 as a set or individually based on all or a part of the model position ya, the position detection value ym, and the torque command τr according to predetermined condition determination and a predetermined calculation formula. The gain changing unit 7 notifies the variable-compensation calculating unit 4 of the determined values using a gain change signal sg and sets the values.

For example, when the control gains K0, K1, and K2 used in the variable-compensation calculating unit 4 are changed according to characteristics and a use of a mechanical system applied with the servo control device, if a deviation between the model position ya and the position detection value ym or a signal obtained by applying a filter operation to the deviation is larger than a threshold, the gain changing unit 7 determines that a gain condition is a high gain condition for selecting a higher gain than a normal condition. The gain changing unit 7 then outputs the gain change signal sg (e.g., a signal with a logical value "0" or "1") corresponding to the condition determination to the variable-compensation calculating unit 4.

If the gain change signal sg is the signal with the logical value "0", the variable-compensation calculating unit 4 uses, for example, a predetermined fixed value without changing the values of the control gains K0, K1, and K2. On the other hand, if the gain change signal sg is the signal with the logical value "1", the variable-compensation calculating unit 4 uses, for example, a predetermined value obtained by changing the values of the control gains K0, K1, and K2 as a set.

The gain changing unit 7 calculates, using a predetermined numerical value such as a change scaling factor according to a result of the determination, the control gains K0, K1, and K2 of the high gain condition to have a predetermined relation in which a speed response frequency ωsc, a zero point, and the like explained below are taken into account and sets the calculated values in the variable-compensation calculating unit 4 according to the gain change signal sg. The value of the change scaling factor, which is a base for the control gains of the normal condition and the high gain condition, is determined by experiments or the like under the respective conditions to prevent problems, such as oscillation, from occurring under the conditions.

Alternatively, in another applied use of the servo control device, the gain changing unit 7 determines that the servo control device is in a no-load state when the absolute value of the torque command it is smaller than a predetermined threshold, determines that the gain condition is a low gain condition for selecting gains lower than the control gains of the normal condition, outputs the gain change signal sg corresponding to the condition determination to the variable-compensation calculating unit 4, and sets the control gains of the low gain in the variable-compensation calculating unit 4.

In general, in order to realize high-speed and high-accuracy control, it is necessary to increase the control gains in control (position control and speed control) for performing feedback control of an operating position and operating speed of the controlled object 2. However, conversely, when the control gains are excessively increased, destabilization, such as oscillation, is induced. Therefore, it is necessary to increase the control gains within a range in which the destabilization is not caused. The ease of the oscillation changes according to operation conditions, such as speed and acceleration.

Concerning this problem, in the first embodiment, all gain change results by the gain changing unit 7 are reflected on the calculation of the deviation compensation torque τb through the integral compensator 5. Therefore, it is possible to perform a gain change corresponding to a condition by the gain changing unit 7 without causing a problem in that discontinuity occurs at a point of the gain switching. As a result, for example, it is possible to increase the control gains only in the case of a condition in which an error tends to be large or in the case of a condition in which oscillation less easily occurs and reduce the control gains in other cases putting importance on stability. Therefore, it is possible to stably realize high-speed and high-accuracy control.

Note that, in the general servo control device, an acceleration signal obtained by subjecting a position detection value detected by an encoder to second-order differential includes a lot of noise and is therefore rarely used for a main control operation. However, in the first embodiment, as explained above, the component of the acceleration signal is always integrated by the integral compensator 5 and used as a characteristic equivalent to the speed proportional control. As a result, the influence of the noise on a torque command does not increase.

Next, a determination method for each gain in the gain changing unit 7 and action and effects of the determination method are explained. In the above explanation, the position PID control is explained using Formula (8). In the case of PID control used in a general process control or the like, usually, a proportional gain is primarily used and an integral gain and a differential gain are secondarily used.

On the other hand, in the case of being used in servo control for a motor, as an actual implementation form, a form of cascade control of speed control and position control equivalent to the position PID control is often implemented. With reference to the speed response frequency $\omega sc$ set by the speed proportional gain and the inertia of the controlled object 2, a breakpoint frequency of integration and a response frequency of position control are set to be a fraction of the speed response frequency $\omega sc$ to obtain a satisfactory disturbance response characteristic.

On the other hand, in the first embodiment, a signal added with a value obtained by multiplying a second-order differential value of the position deviation ye, that is, the acceleration deviation ae by the second-order control gain K2 is integrated by the integral compensator 5 to perform an action in which the second-order control gain K2 is equivalent to the general position differential gain, that is, the speed proportional gain as explained above.

Therefore, the gain changing unit 7 changes the second-order control gain K2 based on, for example, the change scaling factor to be stable under the conditions based on the condition determination. Further, the gain changing unit 7 calculates and changes the first-order control gain K1 and the zeroth-order control gain K0 such that the speed response frequency $\omega sc$, which is a value obtained by dividing the second-order control gain K2 by a set or estimated inertial value J of the controlled object 2 and the control gains K1 and K0 keep a predetermined relation. Consequently, it is possible to always appropriately set a disturbance response characteristic.

Specifically, for example, the gain changing unit 7 calculates and sets the zeroth-order control gain K0 and the first-order control gain K1 such that the frequency of a zero point of the transfer function $\tau b/ye$ represented by Formula (8) has a specified ratio, such as a fraction of the speed response frequency, or a value w1 obtained by dividing the second-order control gain K2, which is an index similar to the zero point, by the first-order control gain K1 and a value w0 obtained by dividing the first-order control gain K1 by the zeroth-order control gain K0 has a predetermined ratio, such as a faction of the speed response frequency. The above predetermined ratio may be calculated not to change a ratio of normal control gains.

Note that the gain changing unit 7 may include a storing element that stores, for example, all of the control gains K0, K1, and K2 corresponding to the high gain condition and include a gain calculating unit that calculates, when setting values in the storing element, the values to have a predetermined relation as explained above. The gain changing unit 7 may be configured to read, when determining that a gain condition is the high gain condition, the control gains K0, K1, and K2 based on the gain change signal sg and set the control gains K0, K1, and K2 in the variable-compensation calculating unit 4.

When the servo control device is applied to a conveying apparatus, the gain changing unit 7 may perform estimation of the inertial value J of the controlled object 2 from, for example, changes in the torque command it and the position detection value ym, detect a point when the weight of a conveyed object changes and the inertial value J greatly changes, and change the second-order control gain K2 such that the speed response frequency $\omega sc$ is always fixed.

As explained above, the second-order control gain K2 greatly affects the disturbance suppression effect and the ease of oscillation and determines the speed of a response called a control band. In the first embodiment, it is possible to switch a value of the second-order control gain K2 during an operation of the controlled object 2 without causing discontinuity of the torque command $\tau r$ and a sudden change in a response of the controlled object 2. As a result, it is possible to always keep the disturbance response characteristic in an optimum state while greatly changing a control characteristic according to the ease of oscillation.

Note that, with regard to the condition determination in the gain changing unit 7, a condition under which the magnitudes of the control gains are desired to change only has to be set as appropriate according to the rule of thumb or the like in accordance with a use applied with the servo control device 1a according to the first embodiment. The condition may be variously set according to an applied use by, besides determining, based on the deviation between the model position ya and the position detection value ym, the condition greatly affected by disturbance as explained above, determining, according to comparison of the torque command $\tau r$ and a predetermined threshold, a condition in which the torque command $\tau r$ is small, which is a condition under which, in general, oscillation due to backlash in a torque transmission mechanism tends to occur or determining a condition such as the vicinity of a stop or fixed speed from the magnitude of the model speed, which is a differential value of the model position ya.

The values of the control gains of the variable-compensation calculating unit 4 changed by the gain changing unit 7 desirably satisfy the relation explained above. However, the magnitudes of the control gains may be determined by trial and error under various conditions by closely examining stability under the conditions. Even if the values of the gains discontinuously greatly change during the operation of the controlled object 2, the torque command $\tau r$ does not excessively steeply change. Therefore, a degree of freedom of selection of setting of the condition determination and setting of the gains after a change is high. According to simple setting by, for example, experiences and trial and error, it is possible to realize highly accurate control in which oscillation less easily occurs than in the past.

Action and effects explained below are obtained by using the reference model unit 3.

As explained above, the reference model unit 3 calculates and outputs the model torque $\tau a$. Therefore, if a model of the controlled object 2 assumed by the reference model unit 3 and a characteristic of the controlled object 2 completely coincide with each other, the mechanical system of the controlled object 2 is driven using the model torque $\tau a$ as the torque command $\tau r$. Consequently, the controlled object 2 operates such that the position detection value ym completely coincides with the model position ya.

Therefore, if a characteristic close to an actual characteristic of the controlled object 2 to some degree can be assumed by the reference model unit 3, a response of the controlled object 2 to the position command yc is schematically determined by the transfer function Fa(s) set by the reference model unit 3 irrespective of the feedback compensation unit including the variable-compensation calculating unit 4 and the integral compensator 5.

The control deviations, such as the position deviation ye, the speed deviation ve, and the acceleration deviation ae, are actually non-zero values because of the influence of an error of the model assumed by the reference model unit 3 with respect to the controlled object 2 and the influence of disturbance applied to the controlled object 2. However, the control deviations are basically small values according to the action of the reference model unit 3.

Even during an operation, acceleration and deceleration, or the like in which the speed is not zero, if a speed fixed state or an acceleration fixed state continues a certain degree of time determined by a control time constant, the control deviations have a characteristic of becoming zero according to the action of the feedback compensation unit including the variable-compensation calculating unit 4 and the integral compensator 5.

Further, because the servo control device 1a includes the reference model unit 3, even while the controlled object 2 is operating according to a change in the position command yc, the feedback compensation unit basically performs compensation for a control deviation close to zero. Therefore, even if a change in the control gains in the variable-compensation calculating unit 4 is performed according to the action of the gain changing unit 7, a follow-up characteristic of the controlled object 2 to the position command yc is not changed. Therefore, there is an effect that a response of the controlled object 2 is not suddenly changed.

As explained above, in the first embodiment, even if the gain changing unit 7 changes values of gains in the variable-compensation calculating unit 4, discontinuity of the torque command τr is not caused during switching of the gains and the follow-up characteristic of the controlled object 2 to the position command yc is not changed. Therefore, a response is not suddenly changed.

The servo control device 1a includes the reference model unit 3. The gain changing unit 7 compares the deviation between the model position ya and the position detection value ym, a signal obtained by causing a high-pass filter to act on the deviation, or the like and a set threshold. Therefore, it is possible to easily detect timing when the influence of disturbance is large while the controlled object 2 is caused to operate. The control gains are increased only under that condition and are reduced in other cases putting importance on stability. Therefore, it is possible to improve control accuracy including control accuracy during acceleration and deceleration while suppressing steady oscillation.

Therefore, according to the first embodiment, even when the control gains are changed according to an operation condition while the controlled object is operating, it is possible to easily and appropriately change the control gains without discontinuously changing a torque command or greatly changing a response characteristic to a position command. Therefore, it is possible to improve control accuracy while suppressing destabilization due to oscillation according to a wide range of uses.

The control gains corresponding to a deviation are changed according to the deviation. Therefore, it is possible to increase the corresponding control gains only when disturbance is large. It is possible to improve control accuracy while suppressing destabilization according to a wide range of uses.

Further, the acceleration deviation ae included in the variable compensation value Dτ generated by the variable-compensation calculating unit 4 is always integrated by the integral compensator 5 and used as a characteristic equivalent to the speed deviation ve. Therefore, the configuration may be such that the gain changing unit 7 changes at least a value of the second-order control gain K2 among the control gains used for the calculation of the variable compensation value Dτ by the variable-compensation calculating unit 4, and the variable-compensation calculating unit 4 adds up a value obtained by multiplying the position deviation ye by the zeroth-order control gain K0 and a value obtained by multiplying at least the second-order differential value (the acceleration deviation ae) of the position deviation ye by the second-order control gain K2, the value of which is changed by the gain changing unit 7, to generate the variable compensation value Dτ and output the variable compensation value Dτ to the integral compensator 5.

With this configuration, even if the second-order control gain K2 equivalent to the speed gain is changed to make the control band variable, the torque command τr can be made continuous. Therefore, it is possible to improve control accuracy while suppressing destabilization according to a wider range of uses.

In addition, the configuration may be such that the variable-compensation calculating unit 4 adds up a value obtained by multiplying the position deviation ye by the zeroth-order control gain K0, a value obtained by multiplying the first-order differential value (the speed deviation ve) of the position deviation ye by the first-order control gain K1, and a value obtained by multiplying the second-order differential value (the acceleration deviation ae) of the position deviation ye by the second-order control gain K2 to generate the variable compensation value Dτ, and the gain changing unit 7 changes, based on a value obtained by dividing the second-order control gain K2 by an inertial value of the controlled object 2, at least a value of one control gain among the zeroth-order, first-order, and second-order control gains used for the calculation of the variable compensation value Dτ by the variable-compensation calculating unit 4.

With this configuration, even if the second-order control gain K2 equivalent to the speed gain is changed to make the control band variable, the torque command it can be made continuous. Therefore, it is possible to change the second-order control gain K2 such that a disturbance suppression effect is always appropriate according to a condition.

Second Embodiment

Figure 2:
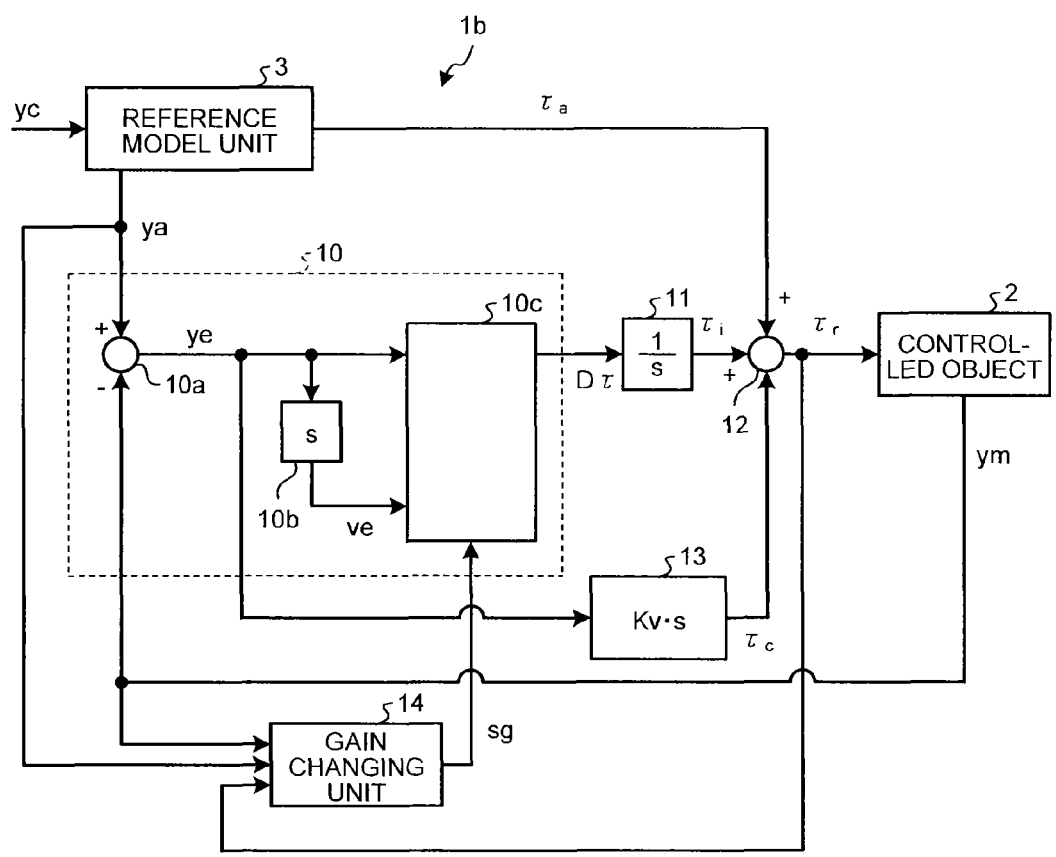
FIG. 2 is a block diagram of the configuration of a servo control device according to a second embodiment of the present invention.

FIG. 2 is a block diagram of the configuration of the servo control device according to a second embodiment of the present invention. Note that, in FIG. 2, components same as or equivalent to the components shown in FIG. 1 (the first embodiment) are denoted by the same reference numerals and signs. Sections related to the second embodiment are mainly explained below.

In FIG. 2, a servo control device 1b according to the second embodiment includes, as a configuration for performing position control for causing an operating position of the controlled object 2 to follow a target value according to feedback control, the reference model unit 3, a variable-compensation calculating unit 10, an integral compensator 11, a torque adder 12, a fixed-gain compensating unit 13, and a gain changing unit 14. The controlled object 2 and the reference model unit 3 are explained in the first embodiment. Therefore, explanation of the controlled object 2 and the reference model unit 3 is omitted.

The variable-compensation calculating unit 10 includes a subtractor 10a, a differentiator 10b, and a variable-gain multiplying and adding unit 10c.

Like the subtractor 4a in the first embodiment, the subtractor 10a calculates the position deviation ye, which is the deviation between the model position ya and the position detection value ym. The position deviation ye is input to the differentiator 10b, the variable-gain multiplying and adding unit 10c, and the fixed-gain compensating unit 13.

Like the differentiator 4b in the first embodiment, the differentiator 10b calculates the speed deviation ve, which is the differential value of the position deviation ye. The speed deviation ve is input to the variable-gain multiplying and adding unit 10c.

As indicated by Formula (9), the variable-gain multiplying and adding unit 10c calculates, as the variable compensation value Dτ, the sum value of a value obtained by multiplying the position deviation ye, which is the deviation between the model position ya and the position detection value ym, by the zeroth-order control gain K0 and a value obtained by multiplying the speed deviation ve, which is the differential of the position deviation ye, by the first-order control gain K1 and outputs the variable compensation value Dτ to the integral compensator 11. The values of the control gains K0 and K1 used at this point are respectively gain values designated by the gain change signal sg input from the gain changing unit 14 explained below.

$$D\tau = K0 \cdot ye + K1 \cdot ve \quad (9)$$

Subsequently, the integral compensator 11 time-integrates the variable compensation value Dτ indicated by Formula (9) calculated by the variable-compensation calculating unit 10, calculates a variable compensation torque τi corresponding to a characteristic of the integration, and outputs the variable compensation torque τi to the torque adder 12. The variable compensation torque τi is indicated by the following Formula (10). Note that, in Formula (10), s represents a Laplacian operator.

$$\tau i = (1/s)(K0 + K \cdot 1s)ye \quad (10)$$

The fixed-gain compensating unit 13 performs, for example, calculation of differential compensation indicated by Formula (11) to calculate a fixed compensation torque τc and outputs the fixed compensation torque τc to the torque adder 12. That is, the fixed-gain compensating unit 13 causes, using a speed gain Kv, which is a fixed gain, differential and multiplication of the speed gain Kv to act on the position deviation ye, which is the deviation between the model position ya and the position detection value ym, and calculates the fixed compensation torque τc.

$$\tau c = (Kv \cdot s)ye \quad (11)$$

Note that the fixed-gain compensating unit 13 may calculate the fixed compensation torque TC according to proportional differential compensation or the like instead of the differential compensation.

The torque adder 12 adds the variable compensation torque τi and the fixed compensation torque τc to the model torque τa to generate the torque command τr to the controlled object 2.

Subsequently, the gain changing unit 14 according to the second embodiment determines, with a method same as the method used by the gain changing unit 7 in the first embodiment denoted by a reference different numeral, values of the control gains K0 and K1 used in the variable-compensation calculating unit 10 as a set or individually based on all or a part of the model position ya, the position detection value ym, and the torque command τr according to predetermined condition determination and a predetermined calculation formula. The gain changing unit 14 notifies the variable-compensation calculating unit 10 of the determined values using the gain change signal sg and sets the values.

That is, like the gain changing unit 7 in the first embodiment, based on the model position ya, the position detection value ym, and the torque command τr, if a deviation between the model position ya and the position detection value ym or a signal obtained by causing a filter to act on the deviation is larger than a set threshold, the gain changing unit 14 determines that a gain condition is a high gain condition for selecting a higher gain than a normal condition. The gain changing unit 14 then outputs the gain change signal sg (e.g., a signal with a logical value "0" or "1") corresponding to the condition determination to the variable-compensation calculating unit 10.

If the gain change signal sg is the signal with the logical value "0", the variable-compensation calculating unit 10 uses, for example, a predetermined fixed value without changing the values of the control gains K0 and K1. On the other hand, if the gain change signal sg is the signal with the logical value "1", the variable-compensation calculating unit 10 uses, for example, a predetermined value obtained by changing the values of the control gains K0 and K1 as a set.

The gain changing unit 14 sets, according to a result of the determination, values of the zeroth-order control gain K0 and the first-order control gain K1, which are gain values higher than usual under the high gain condition stored in advance, as a set or individually in the variable-compensation calculating unit 10 using the gain control signal sg.

Alternatively, in another applied use of the servo control device, the gain changing unit 14 determines that the servo control device is in a no-load state when the absolute value of the torque command τr is smaller than a predetermined threshold, determines that the gain condition is a low gain condition for selecting gains lower than the gains of the normal condition, and sets the values of the control gains K0 and K1 of the low gain corresponding to the condition determination as a set or individually in the variable-compensation calculating unit 10 using the gain change signal sg.

In the second embodiment, as explained above, feedback compensation is performed according to the sum of the variable compensation torque τi and the fixed compensation torque τc. Therefore, when this sum is described as the deviation compensation torque τb explained in the first embodiment, according to Formula (10) and Formula (11), the deviation compensation torque τb in the second embodiment is represented by the following Formula (12):

$$\tau b = \tau i + \tau c = (1/s)(K0 + K1 \cdot s)ye + (Kv \cdot s)ye \quad (12)$$

Then, from Formula (12), the transfer function τb/ye from the position deviation ye to the torque command τr via the deviation compensation torque τb is calculated as the following Formula (13):

$$\tau b/ye = K0/s + K1 + Kv \cdot s \quad (13)$$

That is, the transfer function τb/ye from the position deviation ye to the torque command τr via the deviation compensation torque τb is the same as Formula (8) in the first embodiment and the general PID control. Therefore, in the second embodiment, it is seen that the transfer function τb/ye is equivalent to a transfer function in which the zeroth-order control gain K0 in the variable-compensation calculating unit 10 is a position integral gain, the first-order control gain K1 in the variable-compensation calculating unit 10 is a position proportional gain, and the speed gain Kv in the fixed-gain compensating unit 13 is a position differential gain, that is, a speed proportional gain.

The servo control device 1b according to the second embodiment is configured as explained above. Therefore, as in the first embodiment, with the action of the gain changing unit 14, according to a condition set based on the rule of thumb and trial and error according to the characteristics and the use of the controlled object 2, the control gains are switched while avoiding a problem of a sudden change such that, for example, the control gains are relatively increased when an error tends to be large or when oscillation less easily occurs and the control gains are reduced in other cases putting importance on stability. Consequently, it is possible to stably realize high-speed and high-accuracy control.

The variable compensation value Dτ calculated using the control gains changed by the gain changing unit 14 in the variable-compensation calculating unit 10 is integrated by the integral compensator 11 in the next stage. Therefore, even if the variable compensation value Dτ discontinuously changes during a gain change, the variable compensation torque τi and the torque command τr, which are outputs of the integral compensator 11, continuously change. In other words, although a transfer function that does not take into account the gain change is completely the same as the normal PID control, it is possible to realize switching control that does not cause discontinuity in the torque command τr at all during the gain switching.

Because the servo control device 1b includes the reference model unit 3 to which the position command yc is input, while the controlled object 2 is operating according to a change in the position command yc, even if a change in the variable control gains in the variable-compensation calculating unit 10 is performed according to the action of the gain changing unit 14, as in the first embodiment, there is an effect that a response of the controlled object 2 is not suddenly changed.

In the first embodiment, all of the three control gains K0, K1, and K2 are changing targets of the gain changing unit 7. In the second embodiment, the second-order control gain K2 among the three control gains K0, K1, and K2 is equivalent to the speed gain Kv directly applied from the position deviation ye by the fixed-gain compensating unit 13. That is, in the second embodiment, the speed gain Kv is a fixed value and is not a changing target in the gain changing unit 14.

Consequently, there is an advantage that implementation is easy compared with the first embodiment. On the other hand, the speed of a response generally called control band and characteristics of a high-frequency region of a control system are substantially fixed values and only characteristics equivalent to the position proportional gain and the position integral gain, that is, characteristics of a low-frequency region are variable. Therefore, although a realizable range is narrow compared with the first embodiment, it is possible to realize control for improving control accuracy while suppressing vibration due to destabilization as much as possible by increasing the control gains only at a point when the influence of disturbance is large.

Therefore, in the second embodiment, as in the first embodiment, even when the control gains are changed according to operation conditions while the controlled object is operating, it is possible to easily and appropriately change the control gains without discontinuously changing the torque command and greatly changing a response characteristic to the position command. Therefore, it is possible to improve control accuracy while suppressing destabilization due to oscillation according to a wide range of uses.

Third Embodiment

Figure 3:
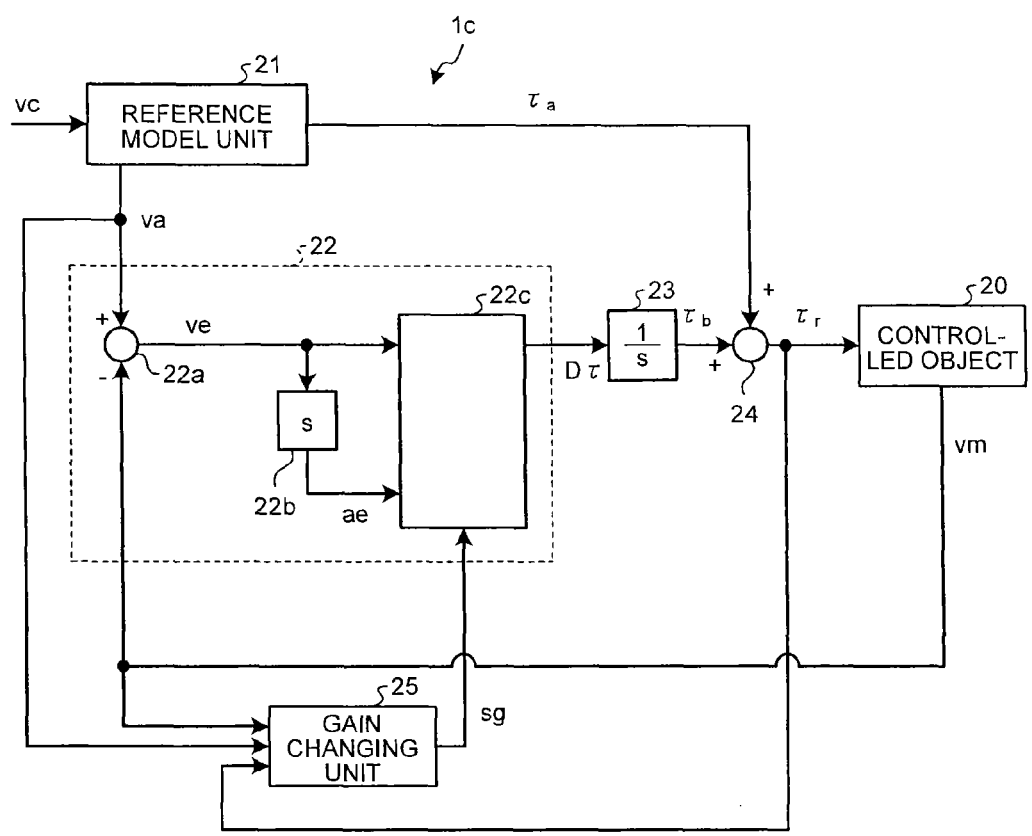
FIG. 3 is a block diagram of the configuration of a servo control device according to a third embodiment of the present invention.

FIG. 3 is a block diagram of the configuration of a servo control device according to a third embodiment of the present invention. In FIG. 3, a servo control device 1c according to the third embodiment includes, as a configuration for performing speed control for causing the operating speed of a controlled object 20 to follow a target value according to feedback control, a reference model unit 21, a variable-compensation calculating unit 22, an integral compensator 23, a torque adder 24, and a gain changing unit 25

Although not shown in the figure, the controlled object 20 includes a motor, a current control unit that controls a driving current to the motor according to the torque command τr from the torque adder 24, and a mechanical system driven by the motor generating torque corresponding to the torque command τr according to the driving current from the current control unit. The detected rotating speed of the motor is output as a speed detection value vm of the controlled object 20. The speed detection value vm is input to the variable-compensation calculating unit 22 and the gain changing unit 25 as a feedback signal. Note that one or both of a speed detector and a position detector are attached to the motor. The speed detection value vm is a detection value of the speed detector or a differential value of a detection value of the position detector.

A speed command vc is input to the reference model unit 21 from a not-shown upper-level apparatus as an operation command. The reference model unit 21 calculates the model speed (a model operation signal) va, with which an assumed model of the controlled object 20 follows the speed command vc according to a characteristic of the predetermined transfer function Fa(s), and calculates the ideal torque (a model torque) τa for the assumed model of the controlled object 20 to operate to coincide with the model speed va calculated in this way.

For example, when a rigid body inertia, an inertia value (a model inertia value) of which is Ja, is assumed as the model of the controlled object 20, the reference model unit 21 performs calculation of the model speed va and calculation of the model acceleration aa, which is a differential value of the model speed va, and multiplies the model acceleration aa by the model inertial value Ja to calculate the torque (the model torque) τa necessary for the operation of the controlled object 20 to coincide with the model speed va.

The model speed va calculated by the reference model unit 21 is input to the variable-compensation calculating unit 22 and the gain changing unit 25. The model torque τa calculated by the reference model unit 21 is input to the torque adder 24.

The variable-compensation calculating unit 22 includes a subtractor 22a, a differentiator 22b, and a variable-gain multiplying and adding unit 22c.

The subtractor 22a calculates the speed deviation ve, which is the deviation (the control deviation) between the model speed va and the speed detection value vm, and outputs the speed deviation ve to the differentiator 22b and the variable-gain multiplying and adding unit 22c.

Like the differentiator 4c in the first embodiment, the differentiator 22b calculates the acceleration deviation ae, which is the differentia value of the speed deviation ve, and outputs the acceleration deviation ae to the variable-gain multiplying and adding unit 22c.

As indicated by Formula (14), the variable-gain multiplying and adding unit 22c calculates, as the variable compensation value Dτ, the sum value of a value obtained by multiplying the speed deviation ve, which is the deviation between the model speed va and the speed detection value vm, by the zeroth-order control gain K0 and a value obtained by multiplying the acceleration deviation ae, which is the differential value of the speed deviation ve, by the first-order control gain K1 and outputs the variable compensation value Dτ to the integral compensator 23. The values of the control gains K0 and K1 used at this point are gain values designated by the gain change signal sg input from the gain changing unit 25 explained below.

$$D\tau = K0 \cdot ve + K1 \cdot ae \quad (14)$$

Subsequently, the integral compensator 23 time-integrates the variable compensation value Dτ indicated by Formula (14) calculated by the variable-compensation calculating unit 22, calculates the deviation compensation torque τb corresponding to a characteristic of the integration, and outputs the deviation compensation torque τb to the torque adder 24. The torque adder 24 then adds the deviation compensation torque τb to the model torque τa and outputs the torque command τr. The torque command it is input to the current control unit in the controlled object 20 and the gain changing unit 25.

The deviation compensation torque τb calculated by the integral compensator 23 is represented by the following Formula (15):

$$\tau b = (1/s)(K0 + K1 \cdot s)ve \quad (15)$$

Note that, in Formula (15), s represents a Laplacian operator. From Formula (15), the transfer function τb/ve of a calculation path until the calculation of the deviation compensation torque τb is performed based on the speed deviation ve is calculated as the following Formula (16):

$$\tau b/ve = K0/s + K1 \quad (16)$$

That is, it is seen that the transfer function of the feedback compensation in the third embodiment is the same as general speed PI control and is equivalent to a transfer function in which the zeroth-order control gain K0 is a speed integral gain and the first-order control gain K1 is a speed proportional gain.

Subsequently, the gain changing unit 25 according to the third embodiment determines values of the control gains K0 and K1 used in the variable-compensation calculating unit 22 as a set or individually based on all or a part of the model speed va, the speed detection value vm, and the torque command τr according to predetermined condition determination and a predetermined calculation formula. The gain changing unit 25 notifies the variable-compensation calculating unit 22 of the determined values using the gain change signal sg and sets the values.

For example, if a deviation between the model speed va and the speed detection value vm is larger than a predetermined threshold, the gain changing unit 25 determines that a gain condition is a high gain condition for selecting a higher gain than a normal condition. The gain changing unit 25 then outputs the gain change signal sg (e.g., a signal with a logical value "0" or "1") corresponding to the condition determination to the variable-compensation calculating unit 22.

If the gain change signal sg is the signal with the logical value "0", the variable-compensation calculating unit 22 uses, for example, a predetermined fixed value without changing the values of the control gains K0 and K1. On the other hand, if the gain change signal sg is the signal with the logical value "1", the variable-compensation calculating unit 22 uses, for example, a predetermined value obtained by changing the values of the control gains K0 and K1 as a set.

The gain changing unit 25 changes the first-order control gain K1 of the high gain condition to a predetermined large value according to a result of the determination, calculates, based on a value obtained by dividing the first-order control gain K1 by the inertial value J of the controlled object 20, the zeroth-order control gain K0 to keep a predetermined relation, and sets the zeroth-order control gain K0 in the variable-compensation calculating unit 22 using the gain change signal sg. Consequently, it is possible to always keep a disturbance response characteristic in an appropriate state.

Alternatively, in another applied use of the servo control device, the gain changing unit 25 determines that the servo control device is in a no-load state when the absolute value of the torque command τr is smaller than a predetermined threshold, determines that the gain condition is a low gain condition for selecting gains lower than the gains of the normal condition, outputs the gain change signal sg corresponding to the condition determination to the variable-compensation calculating unit 22, and sets the control gains of the low gain in the variable-compensation calculating unit 22.

As explained above, according to the third embodiment, the servo control device 1c includes the reference model unit 21 to which the speed command vc is input. Therefore, while the controlled object 20 is operating according to a change in the speed command vc, even if a change in the control gains in the variable-compensation calculating unit 22 is performed according to the action of the gain changing unit 25, as in the first embodiment, there is an effect that a response of the controlled object 20 is not suddenly changed.

Even if the control gains in the variable-compensation calculating unit 22 are changed by the action of the gain changing unit 25, the variable compensation value Dτ calculated using the changed control gains in the variable-compensation calculating unit 22 is integrated by the integral compensator 23 in the next stage. Therefore, even if the variable compensation value Dτ discontinuously changes during a gain change, the deviation compensation torque τb, which is an output of the integral compensator 23, continuously changes. In other words, although a transfer function that does not take into account the gain change is completely the same as the normal speed PI control, it is possible to realize switching control that does not cause discontinuity in the torque command τr at all even when the speed proportional gain is switched.

Therefore, in the third embodiment, the speed control is performed. In the speed control, the control gains are changed according to an operation condition while the controlled object 20 is operating. Consequently, it is possible to improve control accuracy while suppressing destabilization according to a wide range of uses without discontinuously changing the torque command τr and greatly changing a response characteristic to the speed command vc.

Note that, in the first to third embodiments, by describing a driving force as torque, it is clearly indicated that the motor, which is one of the controlled object components, is a rotary motor. However, the motor in the present invention is not limited to the rotary motor and may be a linear motor. That is, if the torque is rephrased as thrust, the content of the first to third embodiments can be directly applied when the motor, which is one of the controlled object components, is the linear motor. This is a reason why the term "driving force" is used in claims rather than the term "torque".

INDUSTRIAL APPLICABILITY

As explained above, the servo control device according to the present invention is useful as a servo control device that can realize, by making the control gains variable, control for improving a control performance more than a control system for a normal fixed control gain for various uses without causing discontinuity of a driving force command and a sudden change of an operation.

REFERENCE SIGNS LIST 1a, 1b, 1c servo control device, 2, 20 controlled object, 3, 21 reference model unit, 4, 10, 22 variable-compensation calculating unit, 4a, 10a, 22a subtractor, 4b, 4c, 10b, 22b differentiator, 4d, 10c, 22c variable-gain multiplying and adding unit, 5, 11, 23 integral compensator, 6, 12, 24 torque adder, 7, 14, 25 gain changing unit, 13 fixed-gain compensating unit.

The invention claimed is:

1. A servo control device that generates, based on an operation detection signal representing a detected operating position or operating speed of a controlled object and an operation command given from a upper-level apparatus as a target value for the operating position or the operating speed of the controlled object, a driving force command, which is a command for generating a driving force given to a motor that drives a mechanical system of the controlled object, such that the operating position or the operating speed of the controlled object follows the operation command, the servo control device comprising:

a reference model unit that calculates, based on the operation command, a model operation signal representing a model operating position or model operating speed, with which an assumed model of the controlled object follows the operation command according to a predetermined characteristic, and calculates a model driving force, which is a driving force necessary for the assumed model of the controlled object to operate to coincide with the calculated model operation signal;

a variable-compensation calculating unit that adds one or both of a value obtained by multiplying a first-order differential value of a control deviation, which is a deviation between the model operation signal and the operation detection signal, by a first-order control gain, which is a second control gain, and a value obtained by multiplying a second-order differential value of the control deviation by a second-order control gain, which is a third control gain, to a value obtained by multiplying the control deviation by a zeroth-order control gain, which is a first control gain, to calculate a variable compensation signal and outputs the variable compensation signal;

a gain changing unit that changes, during an operation of the controlled object, a value of one or both of the first-order control gain and the second-order control gain used for calculation of the variable compensation signal by the variable-compensation calculating unit based on at least one of the model operation signal, the operation detection signal, and the driving force command and reflects the value on calculation of the variable compensation signal;

an integral compensator that integrates the variable compensation signal; and an adder that adds an output of the integral compensator to the model driving force and outputs it as the driving force command.

2. The servo control device according to claim 1, wherein the gain changing unit changes a value of the control gain based on the control deviation, which is a deviation between the model operation signal and the operation detection signal.

3. The servo control device according to claim 1, wherein, when the model operation signal and the operation detection signal are respectively signals of the operating position and the control deviation is a position deviation, the gain changing unit changes a value of the second-order control gain, and the variable-compensation calculating unit uses, when the second-order control gain is used for calculation of the variable compensation signal, the second-order control gain, a value of which is changed by the gain changing unit.

4. The servo control device according to claim 1, wherein, when the model operation signal and the operation detection signal are respectively signals of the operating position and the control deviation is a position deviation, the variable-compensation calculating unit adds a value obtained by multiplying the first-order differential value of the control deviation by the first-order control gain and a value obtained by multiplying the second-order differential value of the control deviation by the second-order control gain to a value obtained by multiplying the control deviation by the zeroth-order control gain to generate the variable compensation signal, and the gain changing unit changes, based on a value obtained by dividing the second-order control gain by an inertial value of the controlled object, a value of at least one control gain among the zeroth-order, first-order, and second-order control gains used for calculation of the variable compensation signal by the variable-compensation calculating unit.

* * * * *